3,048,619
N-ALKENYL-N-PHENYL CARBAMATES
Blaine O. Pray, Wadsworth, Ohio, assignor, by mesne assignments, to Pittsburgh Plate Glass Company
No Drawing. Filed Nov. 14, 1958, Ser. No. 773,848
6 Claims. (Cl. 260—471)

This invention deals with N-alkenyl N-arylcarbamates. It more particularly relates to carbamates which are esters of an N-alkenyl N-arylcarbamic acid and an aliphatic alcohol, most notably alkyl N-alkenyl N-phenylcarbamates.

In accordance with this invention, provided are esters of an N-alkenyl N-arylcarbamic acid and an aliphatic alcohol. Carbamates of this type are highly toxic to rodents such as mice, rats and the like. Because of this toxicity they are useful as rodenticides and may be formulated into compositions designed for the purpose of controlling rodents by poisoning or otherwise destroying them.

Carbamates here contemplated may be represented by the formula:

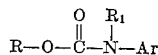

wherein R is the residue of an aliphatic alcohol, usually an alkyl group of 1 to 10 carbo natoms; $R_1$ is a chain comprised predominantly of carbon atoms and having an olefinically unsaturated

group, preferably an alkenyl group having 2 to 10 carbon atoms; and Ar represents an aromatic group such as phenyl, naphthyl, diphenyl or the like, with or without ring substituents. In these carbamates, both a ring carbon of the aryl group and the alkenyl group are linked directly to the carbamate nitrogen. Those carbamates in which R represents the residue of a monohydric aliphatic alcohol of 2 to 10 carbons and $R_1$ is an alkenyl group containing 2 to 5 carbon atoms are particularly preferred.

These carbamates may be prepared by any of several methods. One involves their preparation by the reaction of a haloformate of an aliphatic alcohol (usually the chloroformate) and an N-alkenyl arylamine such as N-vinyl aniline. The reaction is such that hydrogen halide is evolved as a by-product. Thus, this reaction proceeds best when provision is made for removing the evolved by-product, hydrogen halide. Chemically binding the evolved hydrogen halide by the use of hydrogen halide acceptor such as sodium hydroxide effectively serves this purpose.

This reaction proceeds easily in the liquid phase and usually at temperatures between 0° C. and 50° C. Thus, both reactants along with a hydrogen halide acceptor are mixed to provide a liquid reaction medium in which the carbamate is formed. The evolved hydrogen halide is chemically bound by the hydrogen halide acceptor. As a consequence of the reaction, the haloformate halogen combines with the amino hydrogen of the arylamine, thus liberating hydrogen halide and linking directly to the amino nitrogen the carboxylic carbon of the haloformate halogen combines with the amino hydrogen of the arylamine, thus liberating hydrogen halide and linking directly to the amino nitrogen the carboxylic carbon of the haloformate group.

Both inorganic bases and organic bases are capable of functioning to bind cemically the hydrogen chloride. Useful inorganic bases besides sodium hydroxide or like alkali metal hydroxides such as potassium hydroxide include oxides, hydroxides, carbonates and bicarbonates of sodium, barium, strontium, calcium, potassium and magnesium. These inorganic bases function best when they are included in the reaction medium as aqueous solutions or aqueous dispersions of finely divided particles, depending upon their respective water solubility. Organic bases such as pyridine quaternary ammonium bases, typical of which is trimethylphenyl ammonium hydroxide and the like, also are useful, forming their hydrohalides or halides, respectively. With amines as the hydrogen halide acceptor, it is provident to employ a tertiary amine or an amine which is inert toward haloformates. However, the arylamine reactant if used in sufficient excess may function as the hydrogen halide acceptor.

Other methods for formation of these carbamates include reaction of an alcohol with the carbamyl chloride of an N-alkenyl arylamine. This reaction usually is effected at elevated temperatures of 80° C. to 120° C., ideally while refluxing the reaction mixture containing the reactants.

In either of the two described reactions, the reaction occurs in the liquid phase. Besides the reactant and other specified components, the reaction medium may advantageously include an inert organic solvent, e.g., an organic solvent free from reactive amino and/or hydroxyl groups such as benzene, xylene, toluene, halogenated hydrocarbons, especially the chlorinated hydrocarbons such as monochlorobenzene, carbon tetrachloride, ethylene dichloride, trichloroethylene, methyl chloroform and perchloroethylene among others. In many instances, inert diluents facilitate product recovery, improve yields, or otherwise offer conveniences.

The following examples illustrate the manner in which the contemplated carbamates may be prepared:

Example I

A mixture of 66.6 grams (0.5 mole) of N-allyl aniline, 200 milliliters of benzene and 70 milliliters of water were charged to a glass flask. While agitating this mixture, 67.4 grams (0.55 mole) of isopropyl chloroformate (99.1 per cent by weight isopropyl chloroformate) and 90 grams of aqueous sodium hydroxide solution containing 25 percent by weight sodium hydroxide were individually and simultaneously added dropwise over a period of 77 minutes to the mixture. During this addition, the temperature was between 5° C. and 18° C.

Thereafter, 70 milliliters of benzene and 70 milliliters of water were added and the mixture agitated for an additional 90 minutes. After this period, the aqueous and organic layers were phase separated and the organic phase washed successively with three normal hydrochloric acid and water, then dried.

Most of the benzene was removed by evaporation and the last amount of benzene was removed by distilling. In this manner, some 96 grams of a liquid product, isopropyl N-allyl N-phenylcarbamate, was recovered having a refractive index of 1.5093. Upon analysis for nitrogen, the product was found to contain 6.4 percent nitrogen by weight.

The product may be depicted as having the structural formula:

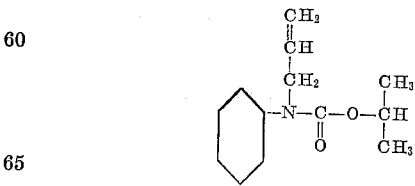

Example II

A glass flask was charged with 200 milliliters of benzene, 70 milliliters of water and 60.7 grams (0.4124 mole) of N-2-butenyl aniline. While agitating this mixture, 55.6 grams (0.4536 mole) of isopropyl chloroformate (99.1 percent by weight isopropyl chloroformate) and 76.2 grams of aqueous sodium hydroxide containing 25 percent by weight sodium hydroxide were added simultaneously and separately in a dropwise manner over a period of 50 minutes. During this addition, the flask contents were between 8° C. and 17° C. After the addition was completed, 70 milliliters of benzene and 70 milliliters of water were added and the resulting product containing mixture agitated for an additional 2 hours.

The resulting reaction mixture was phase separated and the organic benzene layer acid washed with three normal hydrochloric acid and then dried. This dried benzene layer was partially evaporated to remove a good portion of the benzene. It was furter purified by distilling under reduced pressure conditions to a maximum temperature of 150° C. (pot temperature) and a minimum pressure of 30 millimeters mercury pressure. A total of 86 grams of liquid product, isopropyl N-2-butenyl N-phenylcarbamate, having a refractive index of 1.505 was recovered. Upon analysis, this product was found to contain 5.8 weight percent nitrogen.

This product is depicted by the following structural formula:

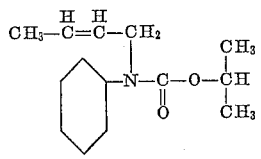

Other N-alkenyl N-arylcarbamates herein contemplated may be prepared by duplicating the procedures of Examples I and II using, in lieu of isopropyl chloroformate, chloroformates or haloformates of alcohols other than isopropyl alcohol. Thus, chloroformates of alcohols such as methanol, ethanol, beta-chloroethanol, propanol, butanol, allyl alcohol, amyl alcohol, propargyl alcohol and other lower aliphatic alcohols containing carbon chains of up to about 10 carbon atoms including decanol. Among these, the carbamates provided by employing chloroformates of saturated aliphatic monohydric alcohols are preferred.

Moreover, the arylamine moiety of the contemplated carbamates may be provided by employing in lieu of the N-allyl aniline or N-2-butenyl aniline other N-alkenyl arylamines following the procedures of Examples I and II. In general, the carbamates of N-alkenyl anilines comprise the preferred. Thus, other contemplated carbamates may be prepared by the procedures of Examples I and II for reacting chloroformates with arylamines by use of other N-alkenyl anilines such as N-allyl aniline, N-vinyl metachloroaniline, N-2-butenyl meta-chloroaniline, N-2-butenyl para-chloroaniline as well as corresponding N-alkenyl anilines which the aromatic ring contains 1 to 5 ring substituents such as halogens, notable chlorine, alkyl, alkoxy, cyano, nitro, alkenyl, chloroalkenyl and the like. The phenyl or like aryl components of the arylamine, accordingly, may have from 1 to 5 of one or more such ring substituents. Corresponding N-alkenyl arylamines such as N-alkenyl naphthylamines and N-alkenyl diphenylamines may also be used to prepare other corresponding N-alkenyl N-arylcarbamates.

Moreover, the procedures exemplified and illustrated by the examples wherein both the chloroformate reactant and the hydrogen halide acceptor (the sodium hydroxide) are independently and gradually added in the presence of solvent comprise a preferred procedure. Yields of carbamate basis the chloroformate reactant are greatest as a rule by such procedures. Nevertheless, the contemplated carbamates may be prepared by simply bringing together in reactive contact the chloroformate and arylamine and making provision for the evolved hydrogen halide.

The toxicity of the carbamates herein contemplated with respect to rodents is illustrated by the following example:

*Example III*

By an accepted test procedure for determining the toxicity of the materials towards mice, isopropyl N-allyl N-phenylcarbamate and isopropyl N-2-butenyl N-phenylcarbamate have demonstrated strong toxicity towards mice.

Summarily, the tests comprise inoculating six Albino Swiss mice with 0.1 milliliter of inoculum containing approximately 400,000 free Toxoplasma organisms. Such inoculum is derived by a 1 to 10 dilution, 0.85 percent saline solution, of the peritoneal exudate of infected mice. Besides the six mice infected in this manner, six uninfected mice are employed as a control. All the mice selected for the test are of a similar age and weight. At the same time six mice are inoculated, administration of the test compounds to the uninfected mice is begun.

This administration of test compound is effected by mixing with the diet, usually at a concentration of 0.1 to 8 percent by weight of the diet, and the mice fed with such diet. Statistics and checks demonstrate that the inoculated mice die within 5.4 days.

Mice fed a diet containing the respective carbamates died three to four days quicker than mice inoculated with an organis known to be lethal to the mice. The rapidity with which the carbamate caused death of the mice, particularly by comparison with the length of period a known lethal inoculum caused death, demonstrated the high toxicity of these carbamates and their rodenticidal properties.

Advantageous utilization of the toxicity of these carbamates toward rodents usually entails devising means for inducing the rodents to consume the carbamate. For example, rodent food may be impregnated or otherwise treated with a lethal dosage and placed in an area of rodent infestation. As indicated by the above test, about 1 milligram or even less of the carbamate is a sufficiently high dosage to destroy the rodent.

Rodenticidal compositions comprising as an active rodenticidal ingredient the contemplated carbamates may also be formulated either as liquid compositions or solid compositions. By dissolving the carbamates in various organic solvents in which they are soluble such as benzene, the chlorobenzenes and the halogenated aliphatic hydrocarbons, liquid compositions are prepared. If desired, aqueous emulsions of these rodenticidal compositions are prepared. If desired, aqueous emulsions of these rodenticidal compositions may be prepared by incorporating a recognized surface active or wetting agent in the organic formulation, following which water may be added. These liquid formulations are useful for applying by spray or the like the toxic dosages of the carbamates to areas of rodent infestation. Solid rodenticidal formulations may be prepared by spraying organic solutions of the contemplated carbamates in a volatile solvent, or by spraying the carbamates in molten form onto finely divided inert particles such as talc, diatomaceous earth, silica, calcium silicate, and the like.

Besides evidencing rodenticidal properties, the contemplated carbamates are useful for other purposes. In the main, they are rather high boiling liquids of substantial resistance to oxidation. As such they are useful as synthetic lubricants.

While the present invention has been described by reference to specific details of certain embodiments, it is not intended that the invention be construed as limited to such details except insofar as they appear in the appended claims.

1. An ester of N-alkenyl N-phenylcarbamic acid and a monohydric aliphatic alcohol having 2 to 10 carbon atoms, said alkenyl group being a hydrocarbon chain having 2 to 10 carbon atoms.

2. An ester of an N-alkenyl N-phenylcarbamic acid and monohydric aliphatic alcohol of 2 to 10 carbon atoms wherein the alkenyl group is a hydrocarbon chain of 2 to 5 carbon atoms.

3. Isopropyl N-allyl N-phenylcarbamate.

4. Isopropyl N-2-butenyl N-phenylcarbamate.

5. An ester of N-alkenyl N-phenylcarbamic acid and a saturated aliphatic monohydric alcohol of 2 to 10 carbon atoms, said alkenyl group being a hydrocarbon chain containing 2 to 5 carbon atoms 6. Isopropyl N-alkenyl N-phenylcarbamate, said alkenyl group having 2 to 10 carbons.

References Cited in the file of this patent

UNITED STATES PATENTS

| | | |
|---|---|---|
| 1,964,654 | Ulrich et al. | June 26, 1934 |
| 2,651,658 | Bohl | Sept. 8, 1953 |
| 2,789,128 | Tursich | Apr. 16, 1957 |
| 2,789,129 | Bessinger | Apr. 16, 1957 |
| 2,863,488 | Short et al. | Dec. 9, 1958 |
| 2,915,550 | Bell et al. | Dec. 1, 1959 |

UNITED STATES PATENT OFFICE
CERTIFICATE OF CORRECTION

Patent No. 3,048,619                                      August 7, 1962

Blaine O. Pray

It is hereby certified that error appears in the above numbered patent requiring correction and that the said Letters Patent should read as corrected below.

Column 1, line 27, for "carbo natoms" read -- carbon atoms --; same column, lines 62 to 65, strike out "halogen combines with the amino hydrogen of the arylamine, thus liberating hydrogen halide and linking directly to the amino nitrogen the carboxylic carbon of the haloformate"; line 67, for "cemically" read -- chemically --; column 3, line 13, for "furter" read -- further --; line 53, after "anilines" insert -- in --; line 54, for "notable" read -- notably --; column 4, line 25, for "organis" read -- organism --; lines 45 to 47, strike out "If desired, aqueous emulsions of these rodenticidal compositions are prepared."; column 6, line 7, for "Bessinger" read -- Bissinger --.

Signed and sealed this 10th day of December 1963.

(SEAL)
Attest:

ERNEST W. SWIDER
Attesting Officer

EDWIN L. REYNOLDS

Acting Commissioner of Patents